United States Patent
Billau et al.

(10) Patent No.: US 10,805,516 B2
(45) Date of Patent: Oct. 13, 2020

(54) AGGREGATION AND CONTROL OF REMOTE VIDEO SURVEILLANCE CAMERAS

(71) Applicant: INTERNATIONAL BUSINESS MACHINES CORPORATION, Armonk, NY (US)

(72) Inventors: Ronald L. Billau, Rochester, MN (US); Vincenzo V. Di Luoffo, Sandy Hook, CT (US); Dan P. Dumarot, Cornwall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 374 days.

(21) Appl. No.: 15/272,854

(22) Filed: Sep. 22, 2016

(65) Prior Publication Data
US 2018/0084182 A1    Mar. 22, 2018

(51) Int. Cl.
*H04N 5/232*    (2006.01)
*H04N 7/18*    (2006.01)
*H04W 76/14*    (2018.01)
*G08B 13/196*    (2006.01)

(52) U.S. Cl.
CPC ... *H04N 5/23206* (2013.01); *G08B 13/19656* (2013.01); *H04N 7/181* (2013.01); *H04W 76/14* (2018.02); *G08B 13/19645* (2013.01); *G08B 13/19671* (2013.01)

(58) Field of Classification Search
CPC ... H04N 5/23206; H04N 7/181; H04W 76/14; G08B 13/19656

USPC ........................................................ 348/159
See application file for complete search history.

(56) References Cited

U.S. PATENT DOCUMENTS

| | | | |
|---|---|---|---|
| 7,100,190 B2 | 8/2006 | Johnson et al. | |
| 8,564,661 B2 | 10/2013 | Lipton et al. | |
| 2007/0259717 A1* | 11/2007 | Mattice | A63F 3/00157 463/36 |
| 2008/0198159 A1 | 8/2008 | Liu et al. | |
| 2009/0079831 A1* | 3/2009 | Sethuraman | G08B 13/19645 348/153 |
| 2011/0043627 A1 | 2/2011 | Werling et al. | |
| 2013/0024053 A1* | 1/2013 | Caule | G08B 29/16 701/14 |

OTHER PUBLICATIONS

Gauri M. Jog et al., "Testing in harsh conditions: Tracking resources on construction sites with machine vision", Automation in Construction 20.4, Jul. 2011, p. 1-10.

(Continued)

*Primary Examiner* — Nguyen T Truong
(74) *Attorney, Agent, or Firm* — Cantor Colburn LLP; Teddi Maranzano

(57) ABSTRACT

Embodiments include method, systems and computer program products for aggregation and control of remote video surveillance cameras. In some embodiments, an alert may be received from a point of presence (PoP) system. Based on the alert, it may be determined to obtain video data collected from a plurality of PoP systems. A video stream may be generated using the video data, wherein the video stream comprises data identified in the alert. The video stream may be transmitted to a requesting PoP system.

20 Claims, 5 Drawing Sheets

(56) References Cited

OTHER PUBLICATIONS

Ioannis Brilakis, et al.,"Automated vision tracking of project related entities", Elsevier, Advanced Engineering Informatics, Feb. 18, 2011, p. 1-12.

Phillip B. Gibbons, et al.," IrisNet:An Architecture for a Worldwide Sensor Web", Sensor and Actuator Networks, Publised by IEEE CS Pervasive computing, Oct.-Dec. 2003, p. 1-12.

Weidong Huang, et al.,"HandsInAir: A Wearable System for Remote Collaboration on Physical Tasks", CSCW, Companion, ACM, Feb. 23-27, 2013, p. 1-4.

Wu-chi Feng, et al.,"Moving Towards Massively Scalable Video-Based Sensor Networks", Proceedings of the Workshop on new visions for large-scale networks: research and applications, Mar. 12-14, 2001, p. 1-6.

Hampapur, Arun "S3-R1; The IBM Smart Surveillance System—Release 1", IBM T.J. Watson Research Center; Proceedings of the 2004 ACM SIGHMM workshop on Effective telepresence, pp. 59-62.

* cited by examiner

AGGREGATION AND CONTROL OF REMOTE VIDEO SURVEILLANCE CAMERAS

BACKGROUND

The present disclosure relates to methods, systems and computer program products for aggregating and controlling remote video surveillance cameras.

With the many improvements in technology, surveillance systems may capture data from one or more cameras associated with a system and may analyze the data using a computer analytics system. Cameras may be placed in various locations on a property and may transmit captured data to a server. The data may be monitored by human operators to identify activity or objects or may be monitored by a computer analytics system to auto-generate alerts and alarms. In some embodiments, the computer analytics system may use different techniques, such as facial recognition or object recognition to identify points of interest in a video stream. Despite the prevalence of surveillance systems, often they are not capable of communicating with unrelated surveillance systems.

SUMMARY

In accordance with an embodiment, a method for aggregating and controlling remote video surveillance cameras is provided. The method may include receiving an alert from a point of presence (PoP) system; determining, based on the alert, to obtain video data collected from a plurality of PoP systems; generating a video stream using the video data, wherein the video stream comprises data identified in the alert; and transmitting the video stream to a requesting PoP system.

In another embodiment, a computer program product may comprise a non-transitory storage medium readable by a processing circuit and storing instructions for execution by the processing circuit for performing a method that may include receiving an alert from a point of presence (PoP) system; determining, based on the alert, to obtain video data collected from a plurality of PoP systems; generating a video stream using the video data, wherein the video stream comprises data identified in the alert; and transmitting the video stream to a requesting PoP system.

In another embodiment, a system for optimizing persistency using hybrid memory may include a processor in communication with one or more types of memory. The processor may be configured to receive an alert from a point of presence (PoP) system; determine, based on the alert, to obtain video data collected from a plurality of PoP systems; generate a video stream using the video data, wherein the video stream comprises data identified in the alert; and transmit the video stream to a requesting PoP system.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for aggregating and controlling remote video surveillance cameras are provided. This disclosure is directed to obtaining camera feeds from multiple sources and applying analytics to captured video. Examples of analytics may include setting trigger points so that within a scene or keyframe of a camera feed, a trigger point is activated and an alert may be generated and transmitted to a remote management server. The remote management server may use the trigger point identified in a camera feed and identify the same trigger point in different camera feeds to obtain a higher level or better view of a scene. The remote management server may then "stitch" or otherwise aggregate video data from the different camera feeds into a single video stream. The video stream may then be transmitted to different mobile devices for viewing and searching.

In some embodiments, the methods and systems described herein utilize computer analytics systems in conjunction with public networks to aggregate camera feeds (e.g., live or recorded). Alerts may be generated by the analytics system to a central location (e.g., the remote management server). Based on the information provided in the alert, the remote management server may analyze camera feeds from separate systems (e.g., point of presence systems) that are otherwise not linked and may generate a video stream from the different camera feeds using the information provided in the alerts.

For example, the central location may be a police station or private security company. The remote management server at the central location may receive an alert from a camera feed from a convenience store indicating identification of a car with a specific license plate. The remote management server may then analyze camera feeds from other point of presence systems in the area, such as a camera feed from a pet store or gas station, to determine if any of the feeds contain scenes or keyframes that include the care with the identified license plate. The remote management server may then aggregate or "stitch" together portions of the different camera feeds that contain the pertinent data or point of interest (i.e., identified license plate of a car) to generate a video stream that may then be transmitted to a requesting point of presence system or a mobile device. The video stream may then be viewed and searched by the receive point of presence system or mobile device.

Figure 1:
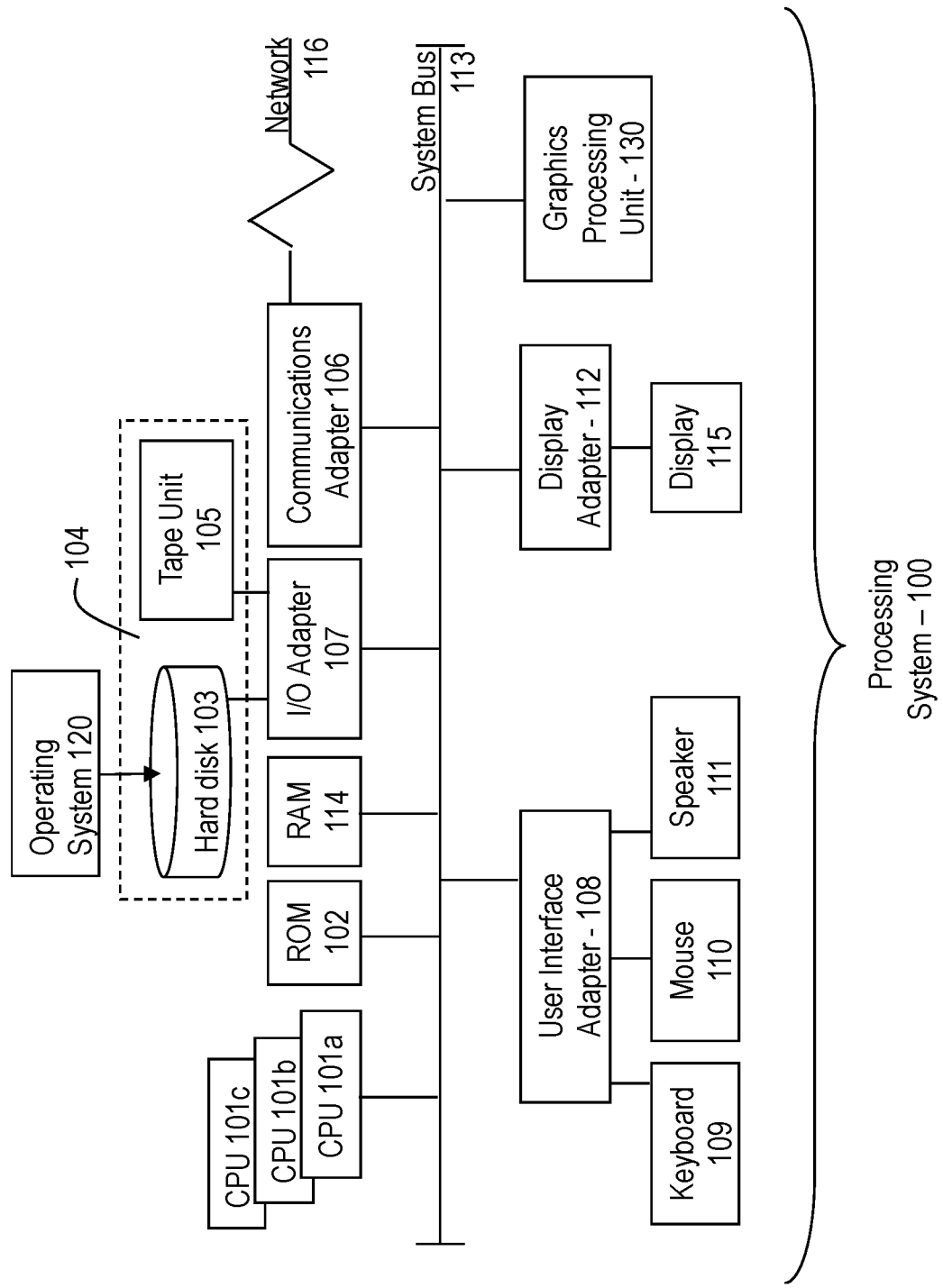
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2A:
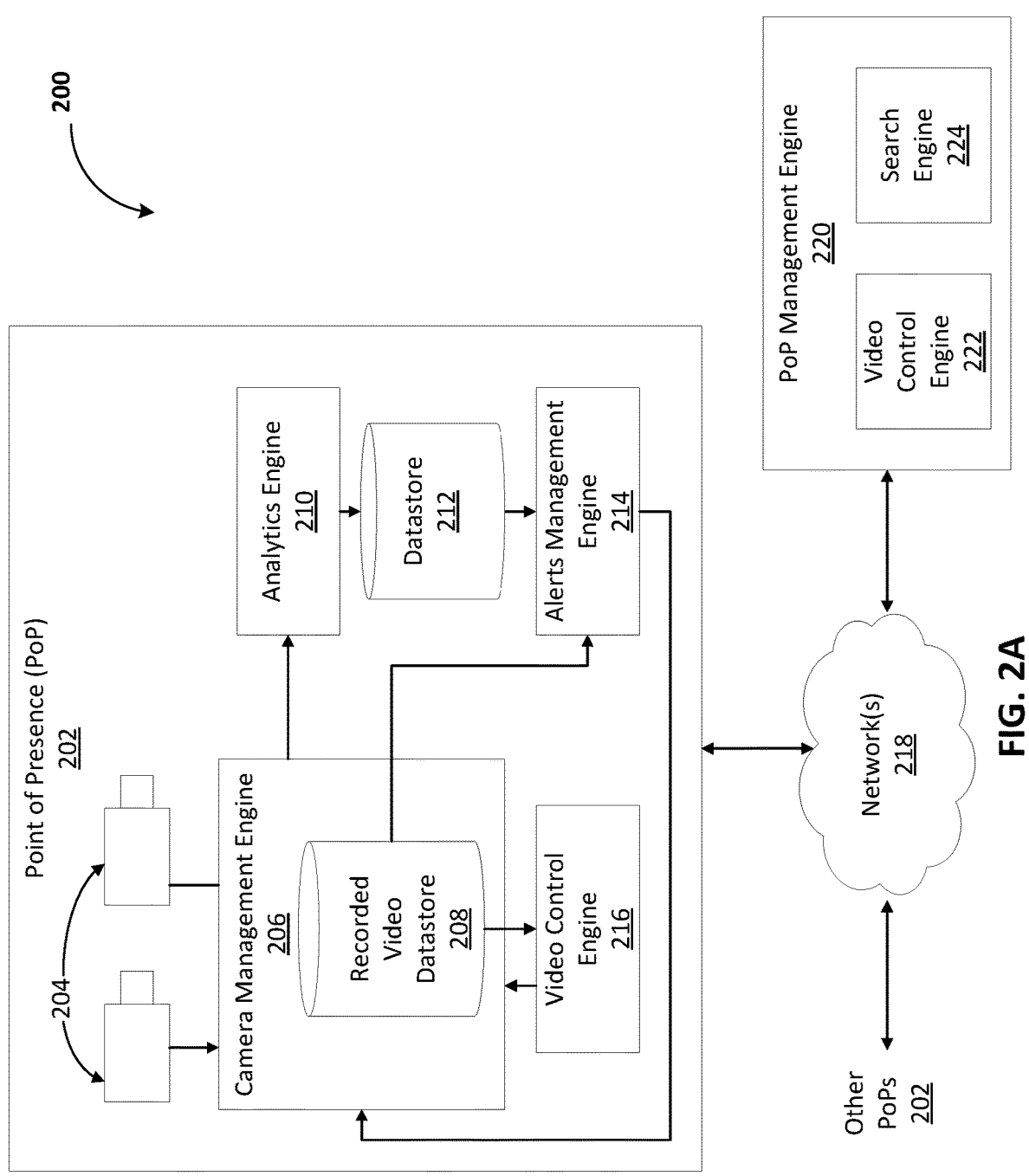
FIGS. 2A, 2B, and 2C are block diagrams illustrating computing systems in accordance with exemplary embodiments.
Figure 2B:
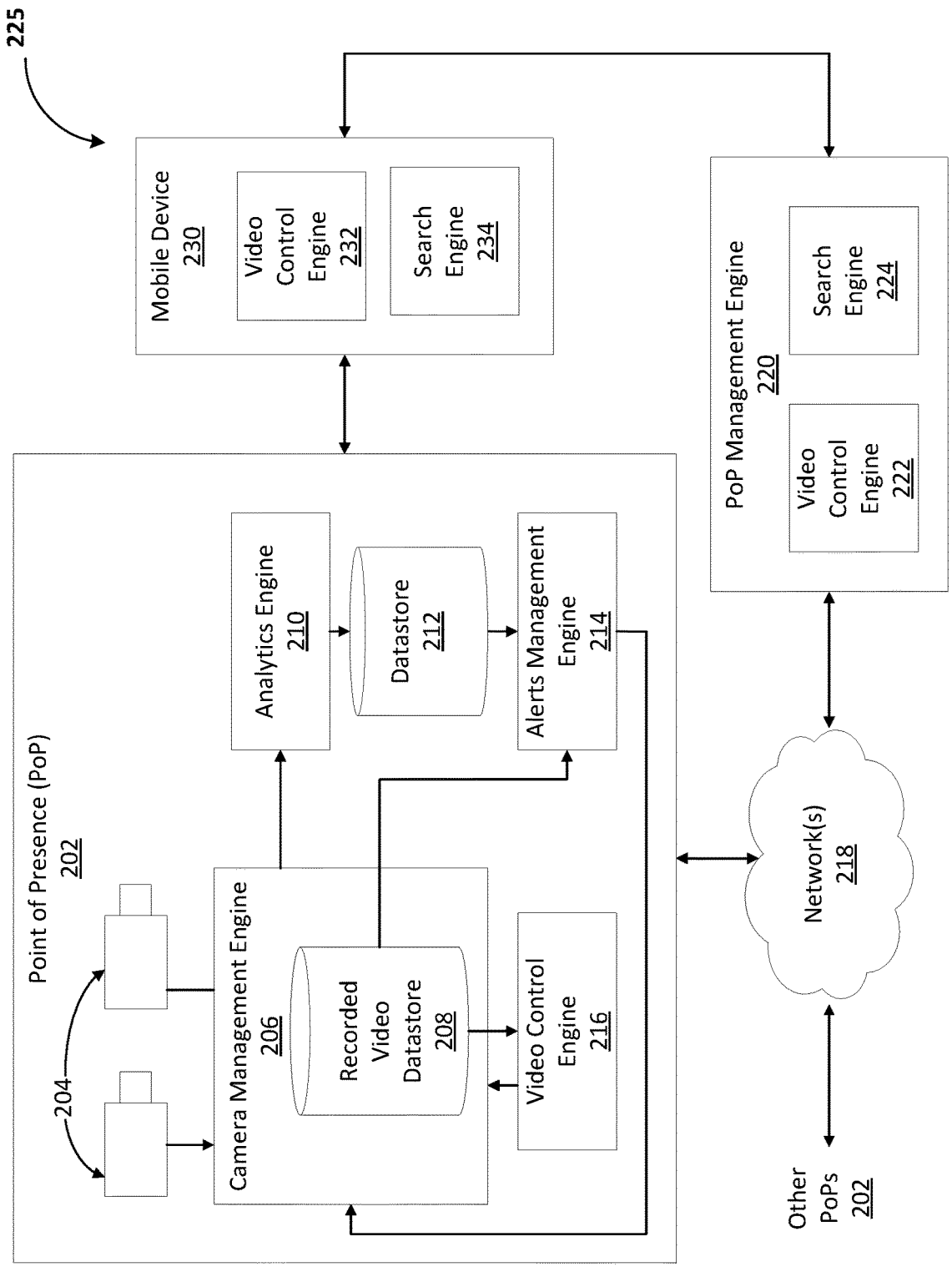
Figure 2C:
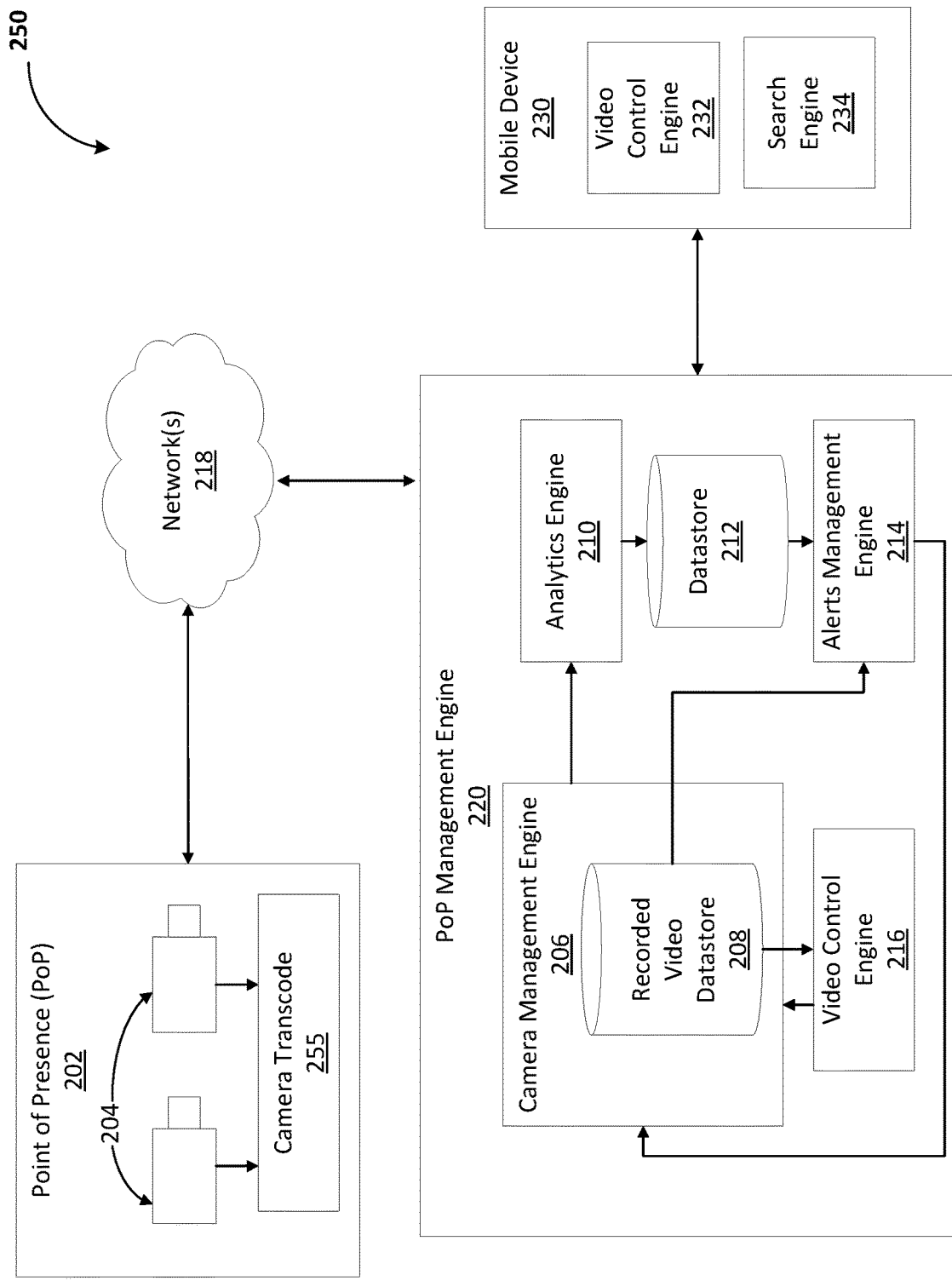

Referring now to FIGS. 2A-2C, are block diagrams illustrating computing systems 200, 225, 250 in accordance with exemplary embodiments are depicted. As illustrated in FIG. 2A, the computing system 200 may include, but is not limited to, multiple point of presence (PoP) systems 202, one or more networks 218, and a PoP management engine 220.

The one or more network(s) 218 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 218 may have any suitable communication range associated therewith and may include, for example, global networks (e.g., the Internet), metropolitan area networks (MANs), wide area networks (WANs), local area networks (LANs), or personal area networks (PANs). In addition, the network(s) 218 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

A PoP system 202 may include one or more cameras 204, a camera management engine 206, an analytics engine 210, an alerts management engine 212, a search engine 214, and/or a video control engine 216. The cameras 204 may be digital or analog, and either internet ready or not.

The camera management engine 206 may include computer-readable instructions that in response to execution by the processor(s) 101 cause operations to be performed including obtaining camera feeds from the one or more cameras 204. The camera management engine 206 may provide a recording function and well as a user interface to monitor both live feeds and recorded video. In some embodiments, the camera management engine 206 may store the camera feeds in a datastore, such as recorded video datastore 208. The camera management engine 206 may transmit camera feeds to an analytics engine 210.

The analytics engine 210 may include computer-readable instructions that in response to execution by the processor(s) 101 cause operations to be performed including receiving one or more camera feeds from the camera management engine 206. The analytics engine 210 may process the received camera feeds and may generate alerts or metadata based on activities or objects of interest in the camera feeds. The activities or objects of interest may be trigger points identified by a user or determined by the analytics engine 210. The analytics engine 210 may activate a trigger point based on its analysis of a camera feed and generate and transmit an alert. The alert may include additional information, such as a keyframe and timecode association of the trigger point in the camera feed. The alert may be transmitted to a datastore 212. The analytics engine 210 may also generate thumbnails of keyframes from the camera feeds that contain the activities or objects of interest. The thumbnails may be included in or associated with alerts transmitted to an alerts management engine 212. The analytics engine 210 may also generate additional metadata, such as alert/keyframe/timecode records, which may be stored in a datastore 212 and managed by the alerts management engine 214.

The alerts management engine 214 may include computer-readable instructions that in response to execution by the processor(s) 101 cause operations to be performed including obtaining alerts from the analytics engine 210 and managing information, such as alert/keyframe/timecode records, in the datastore 212. The alerts management engine 214 may provide a user interface for searching a datastore 212 of the records generated by the analytics engine 210 as well as playback of recorded video from the camera management engine 206. Additionally, the alerts management engine 214 may transmit the alert to a PoP management engine 220.

The video control engine 216 may include computer-readable instructions that in response to execution by the processor(s) 101 cause operations to be performed including viewing a live feed from a camera 204, playback of a camera feed. The video control engine 216 may be accessed by the PoP management engine 220 to access the camera management engine 206 and transmit playback and search controls from an external entity, such as a the PoP management engine 220.

Now referring to the PoP management engine 220, a video control engine 222 and/or a search engine 224 may be included.

The video control engine 222 may include computer-readable instructions that in response to execution by the processor(s) 101 cause operations to be performed including viewing a live feed from a camera 204 and playback of a camera feed. The video control engine 222 may communicate with the camera management engine 206 and transmit playback and search controls from an external entity, via the video control engine 216 of the PoP system 202. In some embodiments, the video control engine 222 may transmit one or more commands to the video control engine 216 of the PoP system 202 to control an aspect of a camera management system. For example, the command may be to change a direction of a camera 204 or directing a camera 204 to zoom in or out at a given time or location. Additionally, the commands may also be to control playback of a recorded video feed. The video control engine 216 may then facilitate transmission of video data obtained after the commands have been executed.

In some embodiments, the video control engine 222 may receive alerts from the PoP system 202 and determine, based on alerts and video data obtained from the PoP system 202, to obtain additional video data from other PoP systems 202. The video control engine 222 may identify the activities or objects of interest from the alerts and may use the activities or objects of interest to obtain video data from other PoP systems 202. The video control engine 222 may then aggregate or "stitch" the video data obtained from the different PoP systems 202. In some embodiments, the video stream generated by stitching the video data from different PoP systems 202 may be generated based on timecode.

The search engine 224 may include computer-readable instructions that in response to execution by the processor(s) 101 cause operations to be performed including generating search queries based on information obtained from a user. The search queries may be transmitted to the video control engine 216 of a PoP system 202 to obtain data from a camera management engine 206 to view specific portions of a camera feed.

Referring now to FIG. 2B, a block diagram that depicts a computing system 225 similar to FIG. 2A but with the addition of a mobile device 230. The mobile device 230 may be any type of device that is able to access a network and capable of video playback. Examples of a mobile device 230 may include, but are not limited to, a smartphone, laptop, tablet, wearable computing devices, and the like. The mobile device may include a video control engine 232 and/or a search engine 234.

In some embodiments, the mobile device 230 may transmit a request for a video stream with a specific object or activity of interest. The video control engine 222 of the PoP management engine 220 may receive the request from the mobile device 230, identify the relevant video stream, and transmit the video stream to the mobile device 230.

In some embodiments, the video control engine 232 may communicate with a PoP management engine 220 to obtain the video stream generated from video data collected from multiple PoP systems 202. The video control engine 232 may enable the mobile device 230 to issue playback commands (e.g., pause, fast forward, rewind, slow motion, etc.) to the PoP management engine 220 to be applied to the video stream transmitted to the mobile device 230. The mobile device 230 does not have to monitor every PoP system 202 (e.g., alerts, video streams, searches, etc.), enabling more efficient bandwidth utilization and provides for a coordinated approach to reacting to wide spread requests for data from different PoP systems 202. The mobile device 230 obtaining the video stream from the PoP management engine 220 may be termed a "far view" because the capability of the PoP management engine 220 is available to the mobile device 230 regardless of location.

In some embodiments, the mobile device 230 may detect that the mobile device 230 is geographically close to a specific PoP system 202 (e.g., based on relative location to a local tower, comparing geolocation information with a PoP system 202, etc.). If the mobile device 230 determines it is within a predetermined proximity to a PoP system 202, the mobile device 230 may establish a direct connection with the PoP system 202 and may have improved access to the PoP system 202 assets. This direct connection with a PoP system 202 may be called a "near view."

In some embodiments, the video control engine 222 may determine that the mobile device 230 is within a predetermined proximity to a PoP system 202 and may facilitate a direct connection between the mobile device 230 and the PoP system 202. For example, the PoP management engine 220 may transmit the authentication credentials or other information necessary to identify the PoP system 202 and establish a direct connection between the mobile device 230 and the PoP system 202. The mobile device 230 may receive the information from the PoP management engine 220 and may establish a direct connection with the PoP system 202 using the information received.

The search engine 224 may include computer-readable instructions that in response to execution by the processor(s) 101 cause operations to be performed including generating search queries based on information obtained from a user. The search queries may be transmitted to the video control engine 216 of a PoP system 202 to obtain data from a camera management engine 206 to view specific portions of a camera feed.

Referring now to FIG. 2C, a block diagram that depicts a computing system 250 with similar capabilities to FIGS. 2A-2B but a different architecture. In FIG. 2C, the analytics system may be located in the PoP management engine 220 instead of the PoP system 202. The analytics system may include, but is not limited to, the camera management engine 206, analytics engine 210, datastore 212, and/or the alerts management engine 214.

The cameras 204 may be digital or analog, and either internet ready or not. Unless the cameras 204 are internet ready, the feeds may be directed to a camera transcode 255. The camera transcode 255 may provide digitization of a camera feed from a camera 204 and a secure internet connection. The PoP system 202 may transmit the live camera feed to the PoP management engine 220 for processing, as described in FIGS. 2A-2B. Additionally, a mobile device 230 may establish a mobile wireless connection as described with the same near view and far view capabilities as described in FIG. 2B. The architecture depicted in FIG. 2C may reduce costs and takes the operational overhead out of the PoP system 202 and in the PoP management engine 220.

Figure 3:
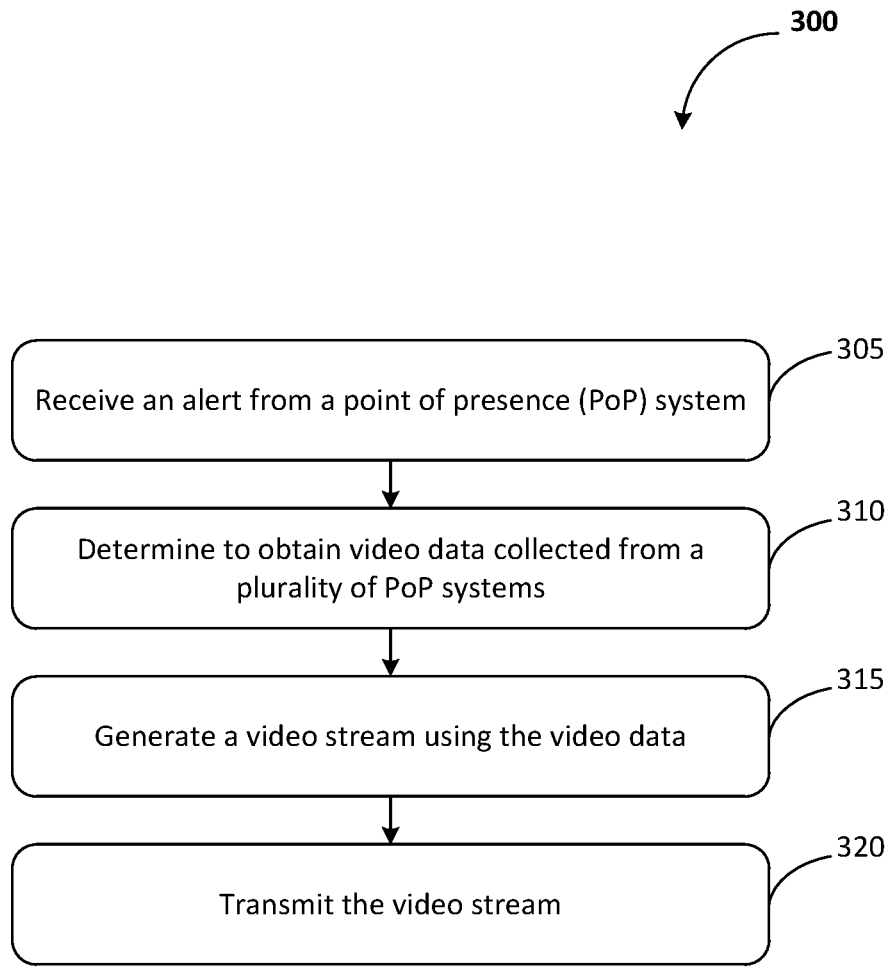
FIG. 3 is a flow diagram of a method for aggregating and controlling remote video surveillance cameras in accordance with an exemplary embodiment.

Referring now to FIG. 3, is a flow diagram of a method 300 for aggregating and controlling remote video surveillance cameras in accordance with an exemplary embodiment is shown. At block 305, an alert is received from a PoP system 202. In some embodiments, the video control engine 222 of a PoP management engine 220 may receive an alert from the alerts management engine 214 of a PoP system 202. The alert may have been generated by the analytics engine 210 using one or more video analytics techniques, such as object identification, facial recognition or the like. The alert may be generated by analyzing video obtained from a camera 204 of the PoP system 202 and identifying data. The identifying data may be a point of interest in the video, such as an object or activity of interest. The identifying data may be provided by a user (e.g., a user may wish to find a car with a specific license plate number) or may be generated by the analytics engine 210. The alert may include or be associated with an object or activity of interest identified in a camera feed by the analytics engine 210. Additionally, the alert may include a thumbnail or keyframe of a camera feed and/or an association with a keyframe and timecode record or may include a keyframe and timecode data.

At block 310, it may be determined to obtain video data collected from multiple PoP systems 202. The video control engine 222 may process the alert to identify the object or activity of interest and may transmit a request to multiple PoP systems 202 requesting video data that may include the identified object or activity of interest. The receiving PoP systems 202 may receive the request and search their respective datastores 212 to identify any video data from their respective camera feeds (e.g., video clips, series of keyframes, etc.) to transmit to the PoP management engine 220.

At block 315, a video stream may be generated using the video data. The video control engine 222 may receive video data from one or more PoP systems 202 and may stitch or otherwise aggregate the received video data into a video stream to track the object or activity of interest through the various video data from the different PoP systems 202. The video stream may be generated using timecode data associated with the video data received from the various PoP systems 202. In some embodiments, the video data received from the PoP systems 202 may be processed to generate alerts, keyframe, and timecode records. In some embodiments, the video control engine 222 may generate alerts, keyframe, and timecode records for the generated video stream.

At block 320, the video stream may be transmitted. In some embodiments, the video stream may be transmitted to a requesting PoP 202. In some embodiments, the video stream may be transmitted to a mobile device 230. The mobile device 230 may communicate with the PoP management engine 220 to control (e.g., play, rewind, fast forward, etc.) the streaming video. For example, the video control engine 232 of the mobile device 230 may request and receive the video stream from the PoP management engine 220. The video control engine 232 may transmit commands associated with playback of the video stream to the video control engine 222 of the PoP management engine 220. The video control engine 222 may transmit the video stream in accordance with the commands received from the mobile device 230.

In some embodiments, the search engine 234 of the mobile device 230 may obtain a search request from a user of the mobile device 230 and transmit the request to the search engine 224 of the PoP management engine 220. The search engine 224 may parse the request to identify a keyword or object. The keyword or object may be used by the search engine 224 of the PoP management engine 220 to identify portions of the video stream that are associated with the keyword or object and may transmit keyframes or video clips associated with the keyword or object to the mobile device 230.

In some embodiments, the PoP management engine 220 may transmit the video stream to a datastore for storage. In some embodiments, the video stream generated may be comprised of video data flagged or otherwise tagged as private or associated with a policy indicating that the data may not be stored. In some embodiments, the video stream may not be stored if any portion of the video stream contains video data that is flagged or tagged as private. In some embodiments, the video stream may remove the video data subject to the privacy restriction. In some embodiments, video streams that are stored in the datastore may be periodically expunged. The expungement of the video streams may be in accordance with one or more policies designated by an administrator or associated with video data that is part of the video stream.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for aggregating and controlling remote video surveillance cameras, the method comprising:
   receiving, by a processing system, an alert from a first point of presence (PoP) system;
   determining, by the processing system, based on the alert, to obtain video data collected from a plurality of PoP systems, wherein the plurality of PoP systems includes the first PoP system and at least one additional PoP system and wherein each of the plurality of PoP systems are separate from one another and are not in communication with one another;
   generating, by the processing system, a video stream using the video data received from the first PoP system and the at least one additional PoP system, wherein the video stream comprises data identified in the alert; and
   transmitting, by the processing system, the video stream to a requesting PoP system.

2. The computer-implemented method of claim 1, further comprising:
   receiving a request for the video stream from a mobile device; and
   transmitting the video stream to the mobile device.

3. The computer-implemented method of claim 2, further comprising:
   determining the mobile device is in a predetermined proximity to the PoP system; and
   facilitating a direct connection between the mobile device and the first PoP system.

4. The computer-implemented method of claim 1, wherein the alert is generated by analyzing video obtained from a camera of the first PoP system and identifying the data, wherein the data is a point of interest in the video.

5. The computer-implemented method of claim 1, further comprising:
   transmitting a command to the at least one additional PoP system to control an aspect of a camera management system; and
   receiving video from the camera management system.

6. The computer-implemented method of claim 1, further comprising:
   receiving a plurality of video data from the plurality of PoP systems; and
   processing the plurality of video data to generate alerts, keyframe, and timecode records.

7. The computer-implemented method of claim 1, wherein the alert comprises keyframe and timecode data.

8. A computer program product comprising a non-transitory storage medium readable by a processing circuit and storing instructions for execution by the processing circuit for performing a method comprising:
   receiving an alert from a first point of presence (PoP) system;
   determining, based on the alert, to obtain video data collected from a plurality of PoP systems, wherein the plurality of PoP systems includes the first PoP system and at least one additional PoP system and wherein each of the plurality of PoP systems are separate from one another and are not in communication with one another;
   generating a video stream using the video data received from the first PoP system and the at least one additional PoP system, wherein the video stream comprises data identified in the alert; and transmitting the video stream to a requesting PoP system.

9. The computer program product of claim 8, the method further comprising:
 receiving a request for the video stream from a mobile device; and
 transmitting the video stream to the mobile device.

10. The computer program product of claim 9, the method further comprising:
 determining the mobile device is in a predetermined proximity to the first PoP system; and
 facilitating a direct connection between the mobile device and the first PoP system.

11. The computer program product of claim 8, wherein the alert is generated by analyzing video obtained from a camera of the first PoP system and identifying the data, wherein the data is a point of interest in the video.

12. The computer program product of claim 8, the method further comprising:
 transmitting a command to the at least one additional PoP system to control an aspect of a camera management system; and
 receiving video from the camera management system.

13. The computer program product of claim 8, the method further comprising:
 receiving a plurality of video data from the plurality of PoP systems; and
 processing the plurality of video data to generate alerts, keyframe, and timecode records.

14. The computer program product of claim 8, wherein the alert comprises keyframe and timecode data.

15. A system, comprising:
 a processor in communication with one or more types of memory, the processor configured to:
 receive an alert from a first point of presence (PoP) system;
 determine, based on the alert, to obtain video data collected from a plurality of PoP systems, wherein the plurality of PoP systems includes the first PoP system and at least one additional PoP system and wherein each of the plurality of PoP systems are separate from one another and are not in communication with one another;
 generate a video stream using the video data received from the first PoP system and the at least one additional PoP system, wherein the video stream comprises data identified in the alert; and
 transmit the video stream to a requesting PoP system.

16. The system of claim 15, wherein the processor is further configured to:
 receive a request for the video stream from a mobile device; and
 transmit the video stream to the mobile device.

17. The system of claim 16, wherein the processor is further configured to:
 determine the mobile device is in a predetermined proximity to the first PoP system; and
 facilitate a direct connection between the mobile device and the first PoP system.

18. The system of claim 15, wherein the alert is generated by analyzing video obtained from a camera of the first PoP system and identifying the data, wherein the data is a point of interest in the video.

19. The system of claim 15, wherein the processor is further configured to:
 transmit a command to the at least one additional PoP system to control an aspect of a camera management system; and
 receive video from the camera management system.

20. The system of claim 15, wherein the processor is further configured to:
 receive a plurality of video data from the plurality of PoP systems; and
 process the plurality of video data to generate alerts, keyframe, and timecode records.

* * * * *